United States Patent
Jordil et al.

(10) Patent No.: US 6,952,883 B2
(45) Date of Patent: *Oct. 11, 2005

(54) DIMENSION-MEASURING COLUMN AND METHOD FOR ENTERING A COMMAND TO SWITCH THE MEASURE MODE IN SUCH A COLUMN

(75) Inventors: Pascal Jordil, Ecoteaux (CH); Charles-Henri Zufferey, Erde (CH)

(73) Assignee: Tesa SA, Renens (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/718,859

(22) Filed: Nov. 21, 2003

(65) Prior Publication Data

US 2004/0103548 A1 Jun. 3, 2004

Related U.S. Application Data

(63) Continuation of application No. 09/996,115, filed on Nov. 28, 2001.

(30) Foreign Application Priority Data

Mar. 14, 2001 (EP) .......................................... 01810258

(51) Int. Cl.[7] ............................................... G01B 5/00
(52) U.S. Cl. .............................. 33/504; 33/832; 33/556; 33/559; 33/542
(58) Field of Search ................... 33/503–504, 832–833, 33/556–559, 561, 815

(56) References Cited

U.S. PATENT DOCUMENTS

| | | | |
|---|---|---|---|
| 3,571,934 A | * | 3/1971 | Buck, Sr. |
| 4,333,238 A | | 6/1982 | McMurtry |
| 5,222,034 A | | 6/1993 | Shelton et al. |
| 5,781,450 A | * | 7/1998 | Glasson ........................ 33/504 |
| 5,883,313 A | * | 3/1999 | Ercole et al. .................. 33/504 |
| 5,898,590 A | * | 4/1999 | Wampler et al. ............... 33/504 |
| 5,953,687 A | * | 9/1999 | Zink et al. .................. 702/168 |
| 5,991,706 A | * | 11/1999 | Tsukamoto et al. ........... 33/281 |
| 6,044,569 A | * | 4/2000 | Ogihara et al. ............... 33/503 |
| 6,131,301 A | | 10/2000 | Sutherland |
| 6,161,079 A | * | 12/2000 | Zink et al. .................. 702/168 |
| 6,301,796 B1 | * | 10/2001 | Cresson ........................ 33/556 |
| 6,307,084 B1 | * | 10/2001 | Matsuki et al. ............... 33/561 |
| 6,357,134 B1 | * | 3/2002 | Hama et al. .................. 33/832 |
| 6,401,352 B1 | * | 6/2002 | Kimura et al. ................ 33/832 |
| 6,446,351 B1 | | 9/2002 | Zhang et al. |
| 6,467,184 B1 | | 10/2002 | Wust et al. |
| 6,813,845 B2 | * | 11/2004 | Jordil et al. ................... 33/833 |
| 2003/0106232 A1 | | 6/2003 | Jordil et al. |
| 2003/0106233 A1 | | 6/2003 | Jordil et al. |
| 2003/0106234 A1 | | 6/2003 | Jordil et al. |
| 2003/0106235 A1 | | 6/2003 | Jordil et al. |
| 2003/0106236 A1 | | 6/2003 | Jordil et al. |

FOREIGN PATENT DOCUMENTS

| EP | 0 916 923 A2 | 5/1999 |
|---|---|---|
| GB | 2 037 436 A | 7/1980 |

* cited by examiner

*Primary Examiner*—Christopher W. Fulton
*Assistant Examiner*—Yaritza Guadalupe
(74) *Attorney, Agent, or Firm*—Pearne & Gordon LLP

(57) ABSTRACT

Method enabling a command to switch the measure mode to be entered in a single vertical axis dimension-measuring column. The mode witch command is entered by pressing the probe tip against the piece to be measured during a time interval greater than a predetermined value. The measuring and displaying system then engages in a search mode of the turn-back point of said piece to be measured.

Application: measurement of inner or outer diameters by means of a single-axis measuring column. The method allows the hole's minimal and maximal points to be determined with a minimum of handling operations.

16 Claims, 5 Drawing Sheets

0.5 S

"beep"

DIMENSION-MEASURING COLUMN AND METHOD FOR ENTERING A COMMAND TO SWITCH THE MEASURE MODE IN SUCH A COLUMN

This is a continuation of U.S. patent application Ser. No. 09/996,115 filed Nov. 28, 2001.

FIELD OF THE INVENTION

The present invention concerns a dimension-measuring column, in particular a single vertical axis column, as well as a method for entering commands to switch the measure mode in such a column.

The content of Application EP01810258.2, filed on Mar. 14, 2001 with the European Patent Office, is hereby incorporated by reference.

RELATED ART

Vertical dimension-measuring columns are frequently used in mechanical workshops or in industry for measuring different vertical coordinates of a work-piece. An example of measuring column 1 is represented diagrammatically in FIG. 1. The shown column comprises a probe tip 12 mounted on a measuring carriage 11 and brought into contact with the piece to be measured 3, as well as a vertical displacement mechanism (not represented) commanded by a crank 13 and making it possible to displace this probe tip vertically along the axis z. The vertical displacement mechanism can be manual or motorized according to the model. A measuring and displaying system 2 allows the vertical position of the probe tip to be determined and displayed on a display. The system 2 also allows the pressing force of the probe tip against the work-piece 3 to be measured. The measuring system uses for example a capacitive, inductive, magneto-resistive or optical sensor comprising for example a scale in the housing 10 and a sensor in the control panel 2.

Usual measuring columns have a housing 10 of a height habitually comprised between 50 centimeters and 2 meters and allow the vertical position of the probe tip 12 to be measured with an accuracy on the order of several microns or less. The piece to be measured 3 is placed close to the measuring column 1 and the probe tip is displaced vertically so as to rest against the portion of the work-piece whose vertical coordinate one wishes to measure. The measuring column 1 can be mounted on an air-cushion bearing-plate 14 that facilitates its horizontal displacement. Such measuring columns are described for example in documents U.S. Pat. No. 4,187,612 and U.S. Pat. No. 3,895,356. Such measuring columns are further commercialized by the applicant under the name MICRO-HITE (registered trademark) and TESA-HITE (registered trademark) for example.

Current measuring columns are usually provided with a measuring and displaying system 2 that make it possible to perform measurements according to different modes, for example for displaying either the absolute height of a point, or the difference between two consecutive points of measurement. Control buttons 21 on the measuring system allow the measure mode to be switched. Different examples of useful measure modes are described in the aforementioned U.S. Pat. No. 3,895,356.

Measuring columns are also known that allow for example the inner diameter of a hole or the outer diameter of a rod to be measured. For this, it is necessary to measure consecutively the two turn-back points, i.e. the lowest and the highest point of the hole or rod, and to calculate the height difference between these two extremes.

Different systems and methods exist for determining the highest and lowest points of a hole or of a rod by means of a single-axis measuring column 1. For example, devices exist that allow the probe tip to slide horizontally along an axis x perpendicular to the page. By exerting a vertical pressure on the axis z, the probe tip 12 comes to rest of its own against the lowest point, respectively highest point, of a hole. The measurement is accomplished at each of these two points and the difference calculated to determine the diameter and/or center of the hole. These mechanical devices are however costly and influence the overall accuracy of the measuring system. Furthermore, the size of the holes to be measured is limited by the maximal amplitude of the probe tip's horizontal displacement. Finally, these devices are poorly adapted for measuring outer diameters, for example when the diameter of a rod is to be measured.

Are also known systems capable of determining automatically the turn-back points (extremes) of a hole or rod. For this, it is necessary to enter in the measuring and displaying system 2 a command enabling it to switch into a turn-back point search mode. This command is generally entered by selecting a control button 21 provided on the control panel or a crank (not represented) close to the probe tip 12. The piece to be measured 3 or the measuring column 1 is then displaced horizontally, by maintaining the holding pressure between the probe tip and the work-piece, so as to scan the area close to the highest or lowest point by overshooting at least once the turn-back point. An extreme-computing algorithm determines the vertical coordinate of the turn-back point; an acoustical and/or optical signal confirms that the point's vertical coordinate has been calculated. The use must then deselect the automatic turn-back point search mode, then displace the probe tip to perform a new measurement, for example to determine the position of the other extreme of the hole or rod in order to calculate its diameter.

These systems have the inconvenience of requiring an important number of handling operations, which renders their use less intuitive. Furthermore, it is necessary to let go of the piece to be measured 3 or the crank 13 for controlling the vertical position of the probe tip in order to switch to the turn-back point search mode. Furthermore, the presence of control buttons 21 whose only function is to switch the measure mode increases the cost of the device.

It is thus an aim of the present invention to propose a method for entering commands to switch the measure mode in a vertical dimension-measuring column that avoids these inconveniences, as well as a measuring column that is improved and easier to use than the measuring columns of the prior art.

BRIEF SUMMARY OF THE INVENTION

According to the invention, these aims are achieved by means of a method and of a measuring column having the characteristics of the corresponding independent claims, variants of preferred embodiments being moreover described in the dependent claims.

In particular, these aims are achieved by means of a method enabling a command to switch the measure mode to be entered in a dimension-measuring column, wherein this mode-switch command is entered by only making use of the position of the probe tip.

This method has the advantage that the mode switch is effected by making use of the position of the probe tip in a particular manner that is different from the manner used for measuring a position and that allows the mode switch to be indicated. It is thus not necessary to let go of the piece to be measured 3 or the height command crank 3 in order to switch the measure mode. Furthermore, no additional button 21 is required.

Preferably, the switch of measure mode is entered by means of deliberate handling operations of the device for controlling the probe tip's position and is confirmed by an aural and/or visual signal. This ensures that the risk can be prevented of the system switching measure mode spontaneously or independently of the user's will.

The invention is based on the observation that the attention of the measuring column user is concentrated at each moment on the position and the trajectory of the probe tip 12. Tests with users have shown that it is more rapid and more intuitive to enter commands to switch the measure mode by acting on this position or trajectory rather than by operating the control panel 2 of the measuring column.

According to a preferred characteristic of the invention, these aims are further achieved by means of a method according to which the command to switch the measure mode is entered by pressing the probe tip against the piece to be measured during a time interval greater than a predetermined value.

This characteristic has the advantage of permitting a very quick and intuitive mode switch: as soon as the probe tip is pressed against the work-piece for a duration greater than the predetermined threshold value, the measuring and displaying system switches measure mode. This switch can be confirmed by an aural and/or visual signal.

According to another preferred characteristic of the invention, the measuring column allows the pressing force of the probe tip against the work-piece to be measured. The command to switch the measure mode is preferably also entered by acting on this pressing force, for example by maintaining the pressing force constant during a predetermined time interval.

Preferably, the switch of measure mode is entered by means of deliberate handling operations of the device for controlling the probe tip's position and is confirmed by an aural and/or visual signal. This ensures that the risk can be prevented of the system switching measure mode spontaneously or independently of the user's will.

DESCRIPTION OF THE DRAWINGS

The invention will be better understood with the aid of the description of an embodiment, given by way of example and illustrated by the attached drawings containing the figures, in which.

DETAILED DESCRIPTION OF THE INVENTION

Figure 1:
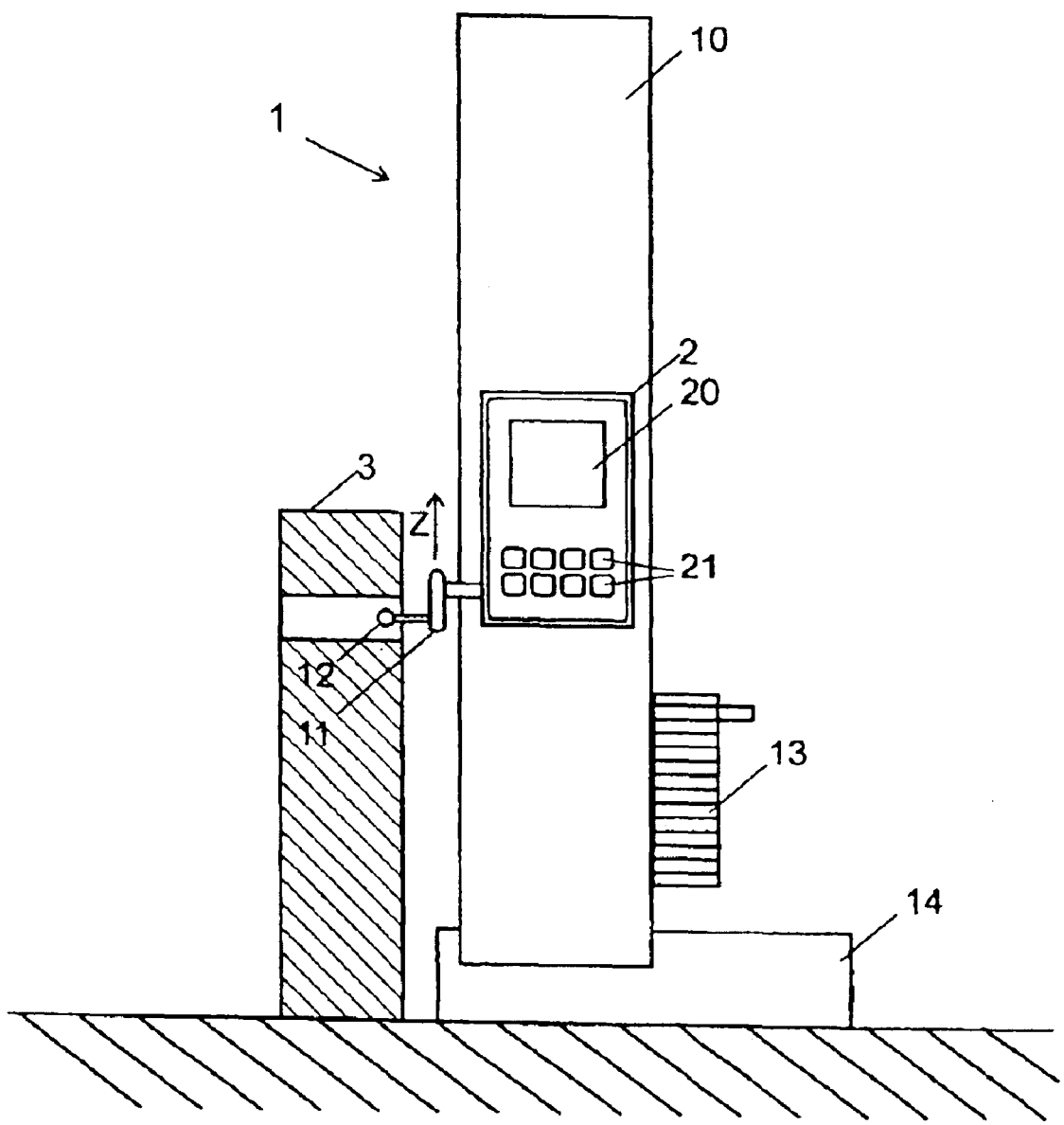
FIG. 1, already described, shows a diagrammatic view of a measuring column to which the invention is applicable.
Figure 2:
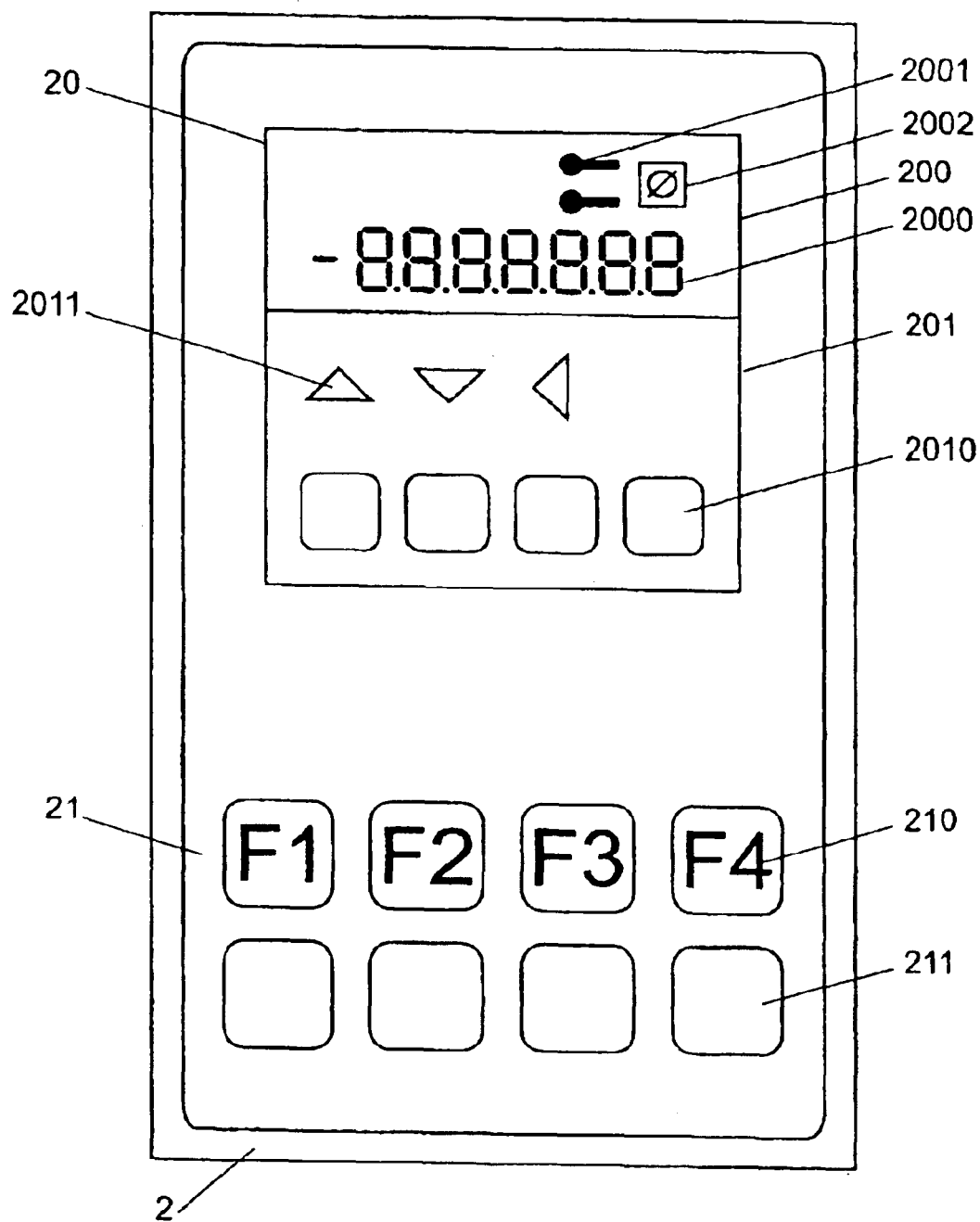
FIG. 2 shows an example of control panel of the measuring and displaying system.

The invention is applicable to measuring columns having one or several axes, manual or motorized, for example to measuring columns of the type illustrated in FIG. 1 and described here above. FIG. 2 shows an example of control panel 2 of the displaying and measuring system of the measuring column according to the invention. The control panel comprises a display 20, for example a liquid crystal or plasma display, as well as several control buttons 21. The measuring and displaying system 2 can also comprise other data entering means, for example a mouse, a joystick a microphone etc., and other output means, for example a loudspeaker, a printer, a serial interface, for example of the type RS232, infrared or radio, etc. It is also possible to connect the measuring and displaying system 2 with a computer or within a network.

The upper part 200 of the display 20 enables the measurement value to be displayed, in this example by means of 7 digits 2000. This value can for example correspond to the absolute vertical position of the probe tip, to a difference between two positions, to a diameter etc., according to the selected measure mode. It will be seen further below that this portion 2000 of the display 20 is reused in the framework of this invention as bar graph to indicate the pressing force of the probe tip against the piece to be measured 3. An icon 2001 indicates if the current measurement includes one or two probes, for example for measuring diameters. An icon 2002 indicates whether one wishes to display the average or the difference between the two last probes effected, for example to chose between a display of the center or of the diameter of a hole.

The lower part 201 of the display indicates by means of icons 2010 the current function of the programmable function keys 210. Triangular symbols 2011 allow the incremental or running direction of the variable or of the selected menu to be indicated.

The control panel 2 further comprises control buttons 21, including programmable function keys 210 and keys 211 having a predefined function, for example an on-off button, a print key, etc.

The measuring and displaying system 2 can function according to several distinct measure modes that can be selected by means of the keys 210–211 or, according to the invention, by displacing the probe tip 12. The available measure modes can comprise for example:

coordinates measurement without taking into account a probe constant, thus allowing only a measurement in a single direction (towards the top or the bottom), for example for measuring stepped work-pieces, dimension measurement taking into account a probe constant, thus allowing a measurement in both directions, for example for measuring the bore diameter, inner or outer diameter measurement, with search of the turn-back point, measurement with continuous display of the probe tip's position, measurement of perpendicularity divergences or of deviations from the straight line, measurement along different axes, etc.

It will be understood that the invention can also be used with any type of control panel or programmable terminal. The represented control panel however has the advantage of comprising a display and an arrangement of buttons already widespread on existing measuring columns, which makes it possible to reduce the costs for developing a new control panel. Furthermore, the users are already accustomed to this type of control panel. It is furthermore also possible to re-program existing measuring columns and measuring and displaying systems in order to use the invention without introducing modifications to the display and to the control buttons.

With the aid of FIGS. 3 to 8, the steps to be followed in order to determine the turn-back point of a hole 30 in a work-piece will now be described. The description refers more particularly to the case where the lowest point (minimum 300) of a hole 300 is to be determined, in the case of the measurement of an inner diameter. It will be understood that identical or similar steps will be followed for determining the highest point (maximum 301) and for determining the highest and lowest points when the outer diameter of a rod is measured.

Figure 3:
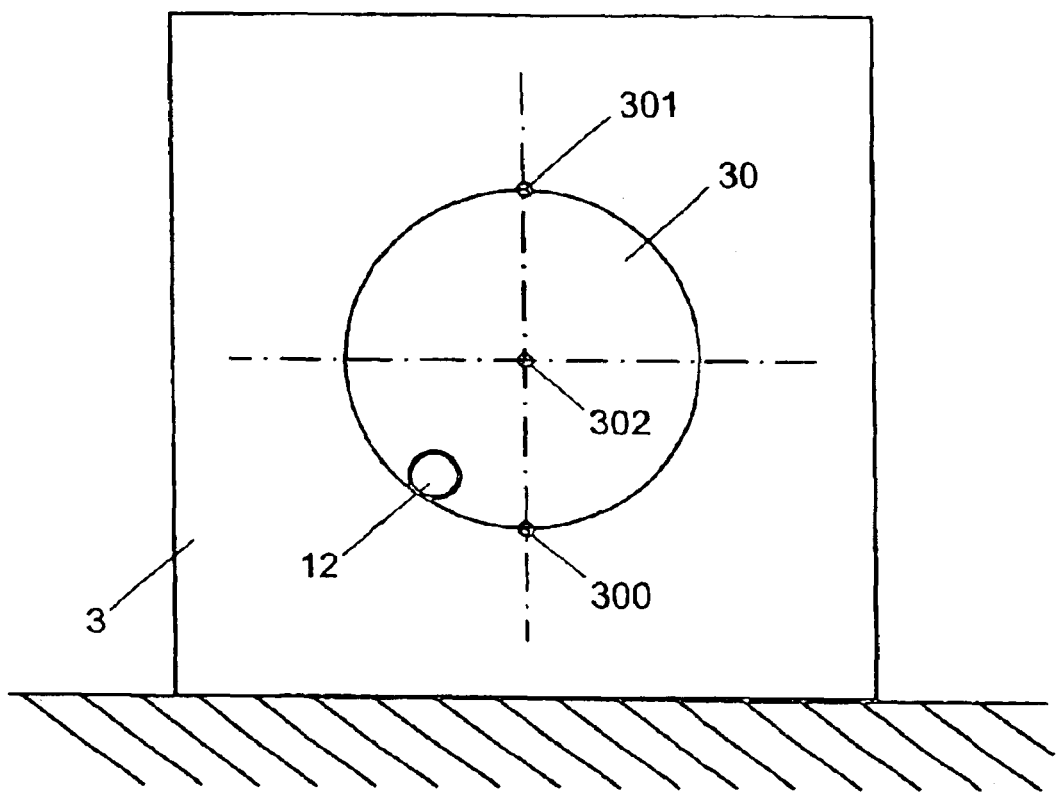
FIG. 3 shows a work-piece having a circular hole, the diameter of which one wishes to measure, as well as the position of the probe tip at the beginning of the turn-back point search.
Figure 4:
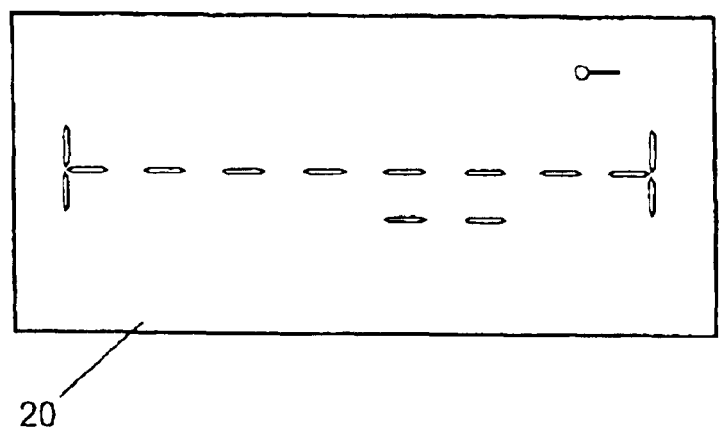
FIG. 4 shows the display status of the control panel at the beginning of the turn-back point search.

In FIG. 3, the probe tip 12 is brought into contact with any point of the inner surface of the hole 30 of the work-piece 3 by acting on the crank 13 or by displacing the work-piece 3 or the column 1. The display 20 of the measuring and displaying system immediately engages into bar graph mode to indicate, with the aid of the digits 2000, the pressing force of the probe tip. The pressing force can also be reproduced by controlling the torque of the crank 13.

The measuring system also enables the direction of the pressing force to be detected and in, this example, displays the bar graph in negative values. In a variant embodiment, it is also possible to display the position of the probe tip 12 rather than the pressing force, or additionally to this force.

Figure 5:
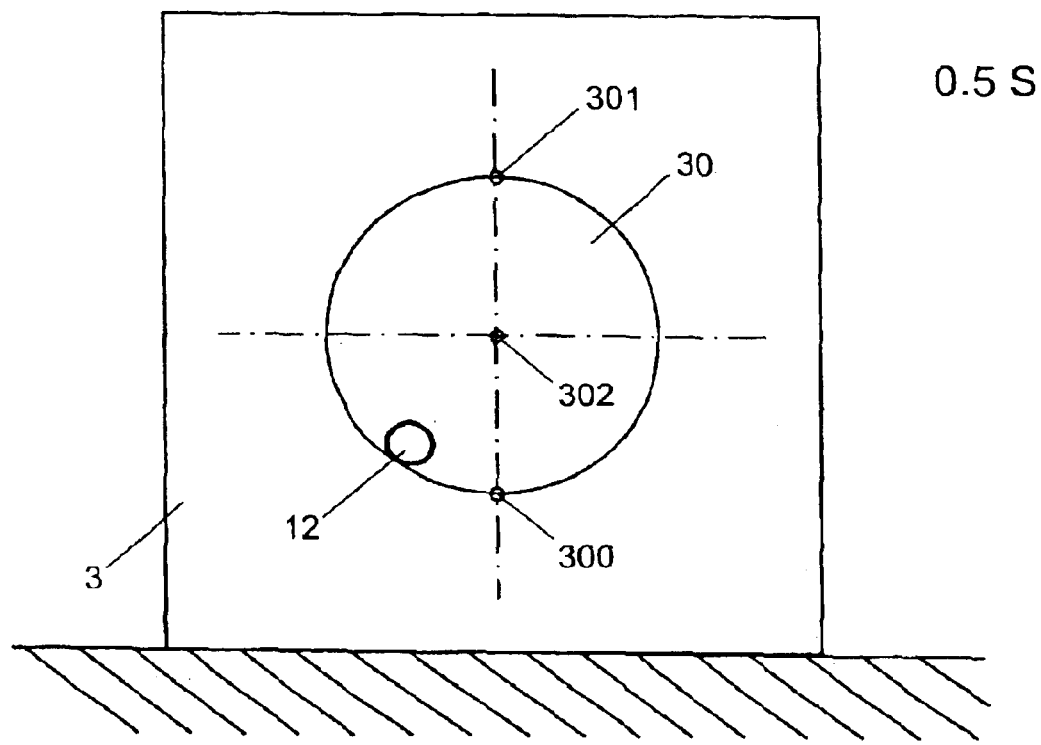
FIG. 5 shows the same work-piece as well as the position of the probe tip in the subsequent stage of the turn-back point search.
Figure 6:
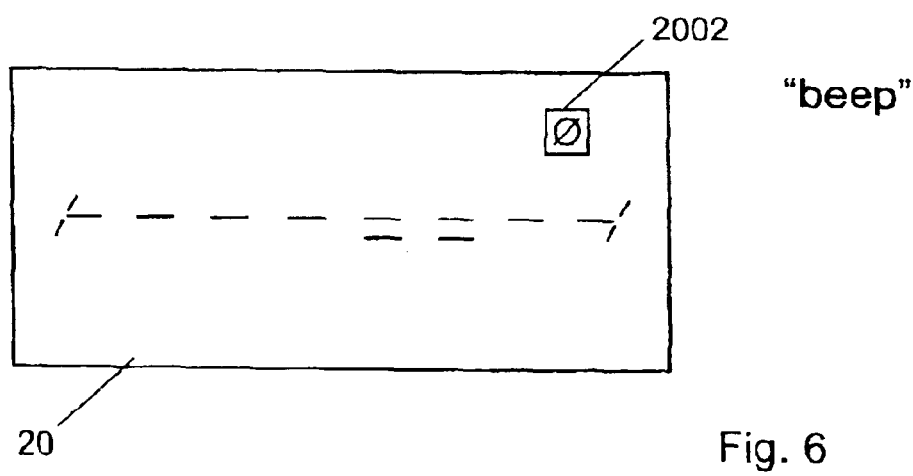
FIG. 6 shows the display status of the control panel during this subsequent stage of the turn-back point search.

If the pressing force is released quickly, the measurement of the probing point is taken into account and displayed on the display 20. If on the contrary the probe tip 12 is maintained firmly in position against the work-piece 3, as illustrated in FIG. 5, the measuring and displaying system automatically switches mode after a predetermined time, for example 0.5 seconds, and engages into turn-back point search mode. This switch is preferably indicated by a sound beep and by a modification of the display 20. In the example shown in FIG. 6, an icon 2002 is displayed to indicate that one wishes to determine the coordinates of a hole's center.

Figure 7:
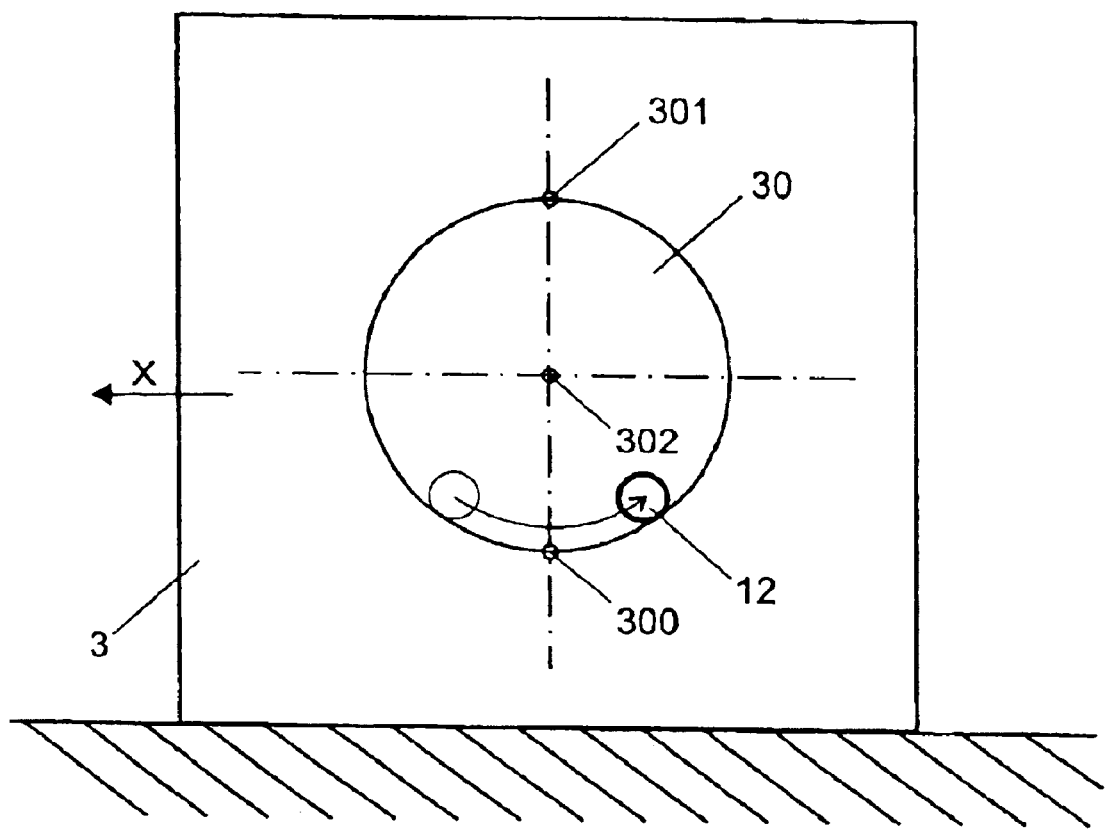
FIG. 7 shows the same work-piece as well as the position of the probe tip when the turn-back point has been scanned.
Figure 8:
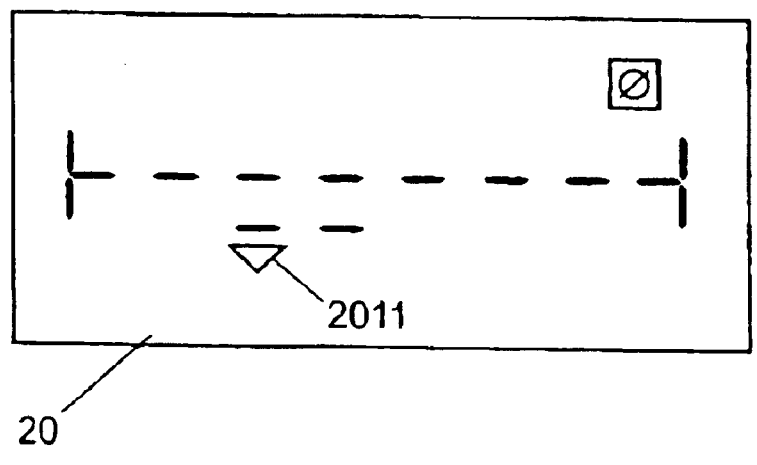
FIG. 8 shows the display status of the control panel when the turn-back point has been found.

In order to determine the lowest point 300 of the hole 30, the piece to be measured 3 or the measuring column 1 is then displaced horizontally, by controlling by means of the crank 13 the pressing force between the probe tip 12 and the work-piece, so as to scan the area close to the extreme by overshooting at least once the turn-back point 300 (FIG. 7). The display 20 illustrated in FIG. 8 indicates continuously the pressing force between the probe tip 12 and the work-piece 3. The measurement of the turn-back point is cancelled when the pressing force exceeds a predefined permissible interval and indicated diagrammatically on the display 20; in this case, the measuring and displaying system reverts to the initial measure mode.

The measuring column remains in the turn-back point search mode as long as a pressing force comprised within the predefined interval is exerted by the probe tip against the piece to be measured. The measuring and displaying system determines the trajectory covered by the probe tip in this mode. An extreme-computing algorithm automatically determines the vertical coordinate of the lowest point of this trajectory (turn-back point 300); an interpolation can possibly be carried out between the two closest extreme measurement points. A sound signal (beep) and/or optical signal 2011 is emitted as soon as the value of the extreme has been found. In order to obtain a more accurate measurement, it is also possible to scan several times in succession, in the opposite direction, the area around the turn-back point 300. In this case, the extreme measurement point is taken into account. In the case where the user generates several successive turn-backs of opposite direction without releasing the pressing force, the measured turn-back point can be validated only when the vertical position of several thereof finds itself within a determined interval.

It can happen that an inexperienced or inattentive user displaces the probe tip in the direction of the hole's lowest point, then returns back without reaching this point 300. In this case, the extreme will be constituted by the turn-back point, which here will be different from the hole's lowest point 300. In order to avoid incorrect measurements, the turn-back point measurement will preferably be validated only if the derivative of the vertical position of the probe tip's trajectory is close to zero at the extreme.

As soon as the extreme 300 has been found, the user can validate the measurement effected by releasing the probe tip 12 so as to separate it from the work-piece 3. The measuring and displaying system 2 reacts to the decrease of the pressing force by immediately quitting the turn-back point search mode and by displaying for example the coordinate of the computed turn-back point.

In order to measure the diameter and/or coordinate of the center 302 of the hole 30, it is then possible to displace the probe tip 12 against the upper portion of the hole 30 and to start again the same search operation to find the hole's upper extreme 301. The measuring and displaying system can be programmed to display either the center 302 (average of the positions 300 and 301) or the diameter (difference between these values) of the hole 30.

In the case of a hole or a work-piece whose other extreme can be found without search, for example in the case of a half-circle hole, it is also possible to measure directly the vertical coordinate of this other point and then display the distance between the two extremes. It is also possible to mix, in the same measurement, two probes of geometrical figures having turn-backs in the same direction.

The method of the invention is preferably used by means of a measuring and displaying system 2 of a new design, or by means of a new command program for measuring and displaying system. It is thus possible to commercialize either new measuring columns, or new measuring and displaying systems 2, or computer programs sold for example on a suitable computer data carrier, for example on a magnetic or optical disk or in the shape of an electronic card of the type EEPROM or Flash, and designed to be loaded into existing measuring systems.

Although the above description refers more particularly to the specific case of a single vertical axis dimension-measuring column, the invention is also applicable to measuring columns in which the probe tip can move along several axes (coordinate measuring systems). In this case, mode-switch commands can also be entered by displacing the probe tip along any axis or combination of possible axes.

Furthermore, it is also possible to enter other commands to switch the measure mode by displacing the probe tip 12. One could thus reset, or calibrate, the measuring system by bringing the probe tip in a reserved position, for example at the top of the column, by having it cover specific trajectories and/or by strongly increasing the pressing force. On could also conceive of entering display mode commands, for example for selecting the display language or the measuring unit by means of the crank 13.

Preferably, the switch of measure mode is entered by means of deliberate handling operations of the device 13 for controlling the probe tip's position. This ensures that the risk can be prevented of the system switching measure mode spontaneously or independently of the user's will. Some mode switches could however be commanded in relation to the probe tip's displacements resulting from normal measurements. One could conceive for example to modify the measuring accuracy and/or resolution according to the speed of the probe tip's displacement.

What is claimed is:

1. Method enabling a command to switch the measure mode to be entered in a dimension-measuring column provided with a probe tip,
    wherein said command to switch the measure mode is entered by only making use of the position of said probe tip,
    wherein said command to switch the measure mode is entered by pressing the probe tip against a piece to be measured during a time interval greater than a predetermined value.

2. The method of claim 1, wherein a measurement of the probing point is effected when the probe tip is pressed against said piece to be measured during a time interval shorter than said predetermined value.

3. The method of claim 2, wherein said predetermined valve is a required duration that is greater than the time interval needed to obtain the measurement.

4. Method enabling a command to switch the measure mode to be entered in a dimension-measuring column provided with a probe tip,
    wherein said command to switch the measure mode is entered by only making use of the position of said probe tip,
    wherein an aural and/or visual signal is emitted during a said mode switch,
    wherein said command to switch the measure mode is entered by pressing the probe tip against a piece to be measured during a time interval greater than a predetermined value.

5. Dimension-measuring column, comprising:
    a probe tip designed for being brought into contact with the piece to be measured,
    a displacement mechanism of said probe tip,
    a measuring and displaying system that allows the position of said probe tip to be determined and displayed, said measuring and displaying system being able to function according to several distinct modes,
    wherein at least one of said measure modes can be selected by acting on the position of the probe tip, without any other handling operating being necessary,
    wherein said measure mode can be selected by pressing the probe tip against the piece to be measured during a time interval greater than a predetermined value.

6. The measuring column of claim 5, wherein the measurement of the probing point is effected when the probe tip is pressed against said piece to be measured during a time interval shorter than said predetermined value.

7. The method of claim 6, wherein said predetermined value is a required duration that is greater than the time interval needed to obtain the measurement.

8. Computer data carrier comprising a command program for measuring and displaying system in a dimension-measuring column, said program enabling the position of the probe tip of said measuring column to be determined and displayed, said program being capable of making said measuring and displaying system function according to several distinct modes,
    wherein said program enables another of said measure modes to be selected by acting on the position of the probe tip for a predetermined time interval.

9. Method enabling a command to switch a measure mode to be entered in a dimensional-measuring column provided with a probe tip,
    wherein said command to switch the measure mode is entered by means of deliberate handling operations of a height-command crank,
    wherein said command to switch the measure mode is entered by pressing said probe tip against a piece to be measured during a time interval shorter than a predetermined value.

10. The method of claim 9, wherein said predetermined value is a required duration that is greater than the time interval needed to obtain the measurement.

11. Method enabling a command to switch the measure mode to be entered in a dimension-measuring column provided with a probe tip,
    wherein said dimension-measuring column enables detecting a pressing force between the probe tip and a piece to be measured;
    wherein said command to switch the measure mode is entered by maintaining the probe tip pressed against said piece to be measured during a time interval longer than a predetermined time greater than zero.

12. The method of claim 11, wherein the measurement mode is limited to only a single dimension.

13. Dimension-measuring column, comprising:
    a probe tip designed for being brought into contact with the piece to be measured,
    a height-command crank for displacing said probe tip,
    a measuring and displaying system that allows the position of said probe tip to be determined and displayed,
    wherein a command to switch the measure mode is entered upon detection of a pressing force between the probe tip and a piece to be measured during a time interval longer than a predetermined time greater than zero.

14. The column of claim 13, wherein the measuring and displaying system is only operable in a single dimension.

15. Method enabling a command to switch the measure mode to be entered in a height-measuring column provided with a probe tip,
    said height-measuring column having a plurality of measure modes for measuring a plurality of different parameters of a piece,
    wherein said command to switch the measure mode is entered by pressing said probe tip against a piece to be measured,
    wherein said height-measuring column remains in said measure mode as long as a sufficient pressing force is exerted for a predetermined time interval by the probe tip against the piece to be measured.

16. Method enabling a command to switch the measure mode to be entered in a dimension-measuring column provided with a probe tip and with one or more measuring axis, wherein said command to switch the measure mode is entered by only making use of the position of said probe tip along only one of said one or more measuring axis.

* * * * *